(12) United States Patent
Tucker

(10) Patent No.: US 7,689,675 B2
(45) Date of Patent: Mar. 30, 2010

(54) SYSTEM AND METHOD FOR COMMUNICATING WITH CONSOLE PORTS

(75) Inventor: Ben Tucker, Bloomington, MN (US)

(73) Assignee: Digi International Inc., Minnetonka, MN (US)

( * ) Notice: Subject to any disclaimer, the term of this patent is extended or adjusted under 35 U.S.C. 154(b) by 1068 days.

(21) Appl. No.: 11/200,876

(22) Filed: Aug. 9, 2005

(65) Prior Publication Data

US 2007/0038739 A1 Feb. 15, 2007

(51) Int. Cl.
G06F 15/177 (2006.01)
G06F 15/173 (2006.01)
G06F 9/00 (2006.01)

(52) U.S. Cl. .......................... 709/220; 709/223; 713/2; 713/100

(58) Field of Classification Search .................. None
See application file for complete search history.

(56) References Cited

U.S. PATENT DOCUMENTS

| | | | |
|---|---|---|---|
| 5,287,461 A | 2/1994 | Moore | |
| 5,748,980 A | 5/1998 | Lipe et al. | |
| 6,336,152 B1 | 1/2002 | Richman et al. | |
| 6,686,838 B1 | 2/2004 | Rezvani et al. | |
| 6,816,897 B2 | 11/2004 | McGuire | |
| 2002/0032762 A1 | 3/2002 | Price et al. | |
| 2002/0161874 A1 | 10/2002 | McGuire | |
| 2002/0161933 A1* | 10/2002 | Shanthaveeraiah et al. | .. 709/328 |
| 2002/0188709 A1 | 12/2002 | McGraw et al. | |
| 2002/0188718 A1 | 12/2002 | McGraw et al. | |
| 2002/0194497 A1 | 12/2002 | McGuire | |
| 2003/0200294 A1 | 10/2003 | Thorpe et al. | |
| 2004/0030879 A1 | 2/2004 | Subramanian et al. | |
| 2004/0153571 A1 | 8/2004 | Nagao | |
| 2006/0026270 A1* | 2/2006 | Sadovsky et al. | ........... 709/222 |
| 2006/0031447 A1 | 2/2006 | Holt et al. | |
| 2006/0200361 A1 | 9/2006 | Insley et al. | |
| 2006/0242271 A1 | 10/2006 | Tucker et al. | |
| 2006/0242401 A1* | 10/2006 | Elliger et al. | .................. 713/2 |

OTHER PUBLICATIONS

"European Search Report for corresponding European Patent Application EP 06254167", (Jan. 2, 2007), 2 pgs.

U.S. Appl. No. 11/179,338, Non-Final Office Action mailed Jul. 22, 2008, 20 pgs.

U.S. Appl. No. 11/179,338, Response filed Nov. 24, 2008 to Non Final Office Action mailed Jul. 22, 2008, 13 pgs.

(Continued)

*Primary Examiner*—Wen-Tai Lin
(74) *Attorney, Agent, or Firm*—Schwegman, Lundberg & Woessner, P.A.

(57) ABSTRACT

In a console server having a user interface and one or more ports, a system and method of accessing devices connected to the ports. A device connected to one of the ports is recognized, wherein recognizing includes recording in a port log information received through a port on a console server from a device that is communicatively coupled to the port and executing instructions that read the information in the port log and determine an operating system that is running on the device from the information in the port log. An application for communicating with the recognized device is selected and the console server communicates with the device using the selected application.

16 Claims, 24 Drawing Sheets

OTHER PUBLICATIONS

U.S. Appl. No. 11/179,338 Final Office Action mailed Feb. 17, 2009, 25 pgs.

European Application Serial No. 06254167.7, Rule 71(3) re Approval of Text/Translations/Grant & Print Fees mailed Apr. 28, 2008, E004, 47 pgs.

"U.S. Appl. No. 11/179,338, Advisory Action mailed Jul. 10, 2009", 3 pgs.

"U.S. Appl. No. 11/179,338, Response filed Jun. 24, 2009 to Final Office Action mailed Feb. 17, 2009", 10 pgs.

* cited by examiner

Console Server Configuration and Management

| User : cmadmin |
|---|

Network

Serial port
  Configuration
  Connection

Clustering

Power controller

System status & log

System administration

System statistics

Apply changes

Login as a different user

Logout

| Serial port configuration | | | | | | | |
|---|---|---|---|---|---|---|---|
| Port access menu configuration | | | | | | | |
| Port access menu configuration | | | | | | | |
| All port configuration | | | | | | | |
| Port# | Title | Mode | Base address | Port | Proto | Serial-settings | |
| All | Port Title | -- | -- | -- | -- | -------- | |
| Individual port configuration | | | | | | | |
| Port# | Title | Mode | Dest/AssignedIP | Port | Proto | Serial-settings | |
| 1 | Loopback Plug | -- | -------- | -- | -- | -------- | |
| 2 | Port Title #2 | CS | 0.0.0.0 | 7003 | SSH | 9600-N-8-1-No | |
| 3 | Cisco Router | -- | -------- | -- | -- | -------- | |
| 4 | Port Title #4 | CS | 0.0.0.0 | 7005 | Telnet | 9600-N-8-1-No | |
| 5 | Sun Sparc Server | -- | -------- | -- | -- | -------- | |
| 6 | Port Title #6 | CS | 192.168.1.107 | 7007 | Telnet | 9600-N-8-1-No | |
| 7 | MS SAC 2003 Console | -- | -------- | -- | -- | -------- | |
| 8 | Port Title #8 | CS | 0.0.0.0 | 7009 | Telnet | 9600-N-8-1-No | |
| 9 | RH Linux Server | -- | -------- | -- | -- | -------- | |
| 10 | Port Title #10 | -- | -------- | -- | -- | -------- | |
| 11 | Port Title #11 | -- | -------- | -- | -- | -------- | |
| 12 | Radius | -- | -------- | -- | -- | -------- | |
| 13 | Port Title #13 | -- | -------- | -- | -- | -------- | |
| 14 | Port Title #14 | -- | -------- | -- | -- | -------- | |
| 15 | Port Title #15 | -- | -------- | -- | -- | -------- | |
| 16 | Port Title #16 | -- | -------- | -- | -- | -------- | |
| Remote port configuration | | | | | | | |
| □ | Title | Mode | Assigned IP | Port | Proto | Remote-settings | Remove |
| | | No remote port found.... | | | | | Add |
| Click [Remove] button to remove the checked remote port profile. | | | | | | | |
| Remote port title : | | | | | | | |

*Fig. 5*

Console Server Configuration and Management

| User : cmadmin | | --- Move to --- |
|---|---|---|

Network

Serial port
  Configuration
  Connection

Clustering

Power controller

System status & log

System administration

System statistics

Apply changes

Login as a different user

Logout

---

Serial port configuration - R1 : Portserver 1

Enable/Disable this port

Enable/Disable this port :    Enable

[Save to flash]  [Save & apply]  [Cancel]

Reset this port :    [Reset]

Set this port as factory default :    [Set]

Port title
Apply all ports settings
Host mode configuration
Remote port parameters
Port logging
Port IP filtering
Authentication
User access control
Alert configuration
Power control configuration

*Fig. 6*

Console Server Configuration and Management

| User : cmadmin |
|---|

Network

Serial port
  Configuration
  Connection

Clustering

Power controller

System status & log

System administration

System statistics

Apply changes

Login as a different user

Logout

---

Serial port configuration - R1 : Portserver 1    --- Move to ---

Enable/Disable this port
Port title
Apply all ports settings
Host mode configuration

Host mode :    Console server
Type of console server :    Other
Rackable Systems Mgmt Card :    Disable
Enable/Disable assigned IP :    Disable
Assigned IP :    0.0.0.0
Listening TCP port (1024-65535) :    7051
Protocol :    Telnet
Inactivity timeout (1-3600 sec, 0 for unlimited) :    100
Enable/Disable port escape sequence :    Enable
Port escape sequence :    Ctrl- z
Port break sequence :
Use comment :
Quick connect via :    No
Web applet encoding :    Web applet    English (latin1)

[Save to flash]  [Save & apply]  [Cancel]

Remote port parameters
Port logging
Port IP filtering
Authentication
User access control
Alert configuration

*Fig. 7*

Console Server Configuration and Management

User : cmadmin

- Network
- Serial port
  - Configuration
  - Connection
- Clustering
- Power controller
- System status & log
- System administration
- System statistics Apply changes Login as a different user Logout

---

Serial port configuration - R1 : Portserver 1     --- Move to ---

Enable/Disable this port
Port title
Apply all ports settings
Host mode configuration
Remote port parameters

IP address :    192.100.1.101

Port :    101

Protocol :    Telnet

[Save to flash] [Save & apply] [Cancel]

Port logging
Port IP filtering
Authentication
User access control
Alert configuration
Power control configuration

*Fig. 8*

Console Server Configuration and Management

| User : cmadmin | | -- Move to -- |
|---|---|---|

Network

Serial port
  Configuration
    Connection

Clustering

Power controller

System status & log

System administration

System statistics

Apply changes

Login as a different user

Logout

Serial port configuration - R1 : Portserver 1

Enable/Disable this port
Port title
Apply all ports settings
Host mode configuration
Remote port parameters
Port logging

Port logging :    [Enable]
Logging direction :    [Server output]
Port log storage location :    [Memory]
Port log to SYSLOG server :    [Disable]
Port log buffer size (KB, 2588 max.) :    50
Port logging filename :    [Specify below]
(null as default file name[portXXdata])
Time stamp to port log :    [Disable]
Show last 10 lines of a log upon connect :    [Disable]
Strip the ^M from SYSLOG :    [Disable]
Automatic backup on mounting :
Monitoring interval (sec, 5-3600) :    5

[Save to flash] [Save & apply] [Cancel]

Port log :

*Fig. 9*

Console Server Configuration and Management

User : cmadmin --- Move to ---

Network

Serial port
  Configuration
  Connection

Clustering

Power controller

System status & log

System administration

System statistics

Apply changes

Login as a different user

Logout

Serial port configuration - R1 : Portserver 1

Enable/Disable this port
Port title
Apply all ports settings
Host mode configuration
Remote port parameters
Port logging
Port IP filtering
  Allowed base host IP :    0.0.0.0
  Subnet mask to be applied :    0.0.0.0

[Save to flash] [Save & apply] [Cancel]

Authentication
User access control
Alert configuration
Power control configuration

*Fig. 10*

Console Server Configuration and Management

| User : cmadmin |
|---|

Network

Serial port
Configuration
 Connection

Clustering

Power controller

System status & log

System administration

System statistics

Apply changes

Login as a different user

Logout

---

Serial port configuration - R1 : Portserver 1    |--- Move to ---|

Enable/Disable this port
Port title
Apply all ports settings
Host mode configuration
Remote port parameters
Port logging
Port IP filtering
Authentication
User access control

| User or Access list | | Access type | | |
|---|---|---|---|---|
| | Port | Monitor | Power | Action |
| <<Everyone>> | ☑ | ☐ | ☐ | |
| | ☑ | ☐ | ☐ | [Add user] |
| --- Select an access list --- | ☑ | ☐ | ☐ | [Add access] |

*Move to Access lists to edit access list.*

Enable/Disable sniff mode :      [Disable]
Sniff session display mode :     [Server output]
Display data direction arrows :  [Disable]
Permit monitoring only mode :    [Disable]

[Save to flash]  [Save & apply]  [Cancel]

Alert configuration
Power control configuration

*Fig. 12*

Console Server Configuration and Management

| User : cmadmin | |
|---|---|

Network
Serial port
  Configuration
  Connection
Clustering
Power controller
System status & log
System administration
System statistics

Apply changes
Login as a different user
Logout

---

Serial port configuration - R1 : Portserver 1     — Move to —

- Enable/Disable this port
- Port title
- Apply all ports settings
- Host mode configuration
- Remote port parameters
- Port logging
- Port IP filtering
- Authentication
- User access control
- Alert configuration
  - [Email alert configuration]
  - Email alert for port login :   Disable
  - Title of email :
  - Recipient's email address :
  - [SNMP trap configuration]

| | | Community | Version |
|---|---|---|---|
| Port login trap : | Disable | public | v1 |
| Use global SNMP configuration : | Disable | public | v1 |
| Trap receiver settings : | | | |
| IP Address | | | |
| 0.0.0.0 | | | |
| 0.0.0.0 | | | |

[ Save to flash ] [ Save & apply ] [ Cancel ]

- Power control configuration

*Fig. 13*

Console Server Configuration and Management

Connectware™

User : cmadmin

Serial port connection

Port access menu connection

Port access menu connection

Individual port connection

| P | C | M | Port# | Title | # of User | Comments |
|---|---|---|---|---|---|---|
| ☐ | ▦ |   | 3 | Cisco Router | 0 | < Not used > |
| ☐ | ▦ |   | 5 | Sun Sparc Server | 0 | < Not used > |
| ☐ | ▦ | ▣ | 7 | MS SAC 2003 Console | 0 | < Not used > |
| ☐ | ▦ |   | 9 | RH Linux Server | 0 | < Not used > |
| ☐ |   |   | R1 | Portserver 1 |   | < Not used > |

Network

Serial port
Configuration
Connection

Clustering

Power controller

System status & log

System administration

System statistics

Apply changes

Login as a different user

Logout

*Fig. 15*

Console Server Configuration and Management

User : cmadmin

- Network
- Serial port
- Clustering
- Power controller
- System status & log
- System administration
- System statistics Apply changes
Login as a different user
Logout

Power controller configuration

Power controllers

| Port# | Manufacturer | Title | Outlets | Action |
|-------|--------------|-------------------|---------|--------|
| 16    | Baytech      | Power Controller  | 8       |        |

*Fig. 16*

Console Server Configuration and Management

| User : cmadmin |
|---|

Network
Serial port
Clustering
Power controller
System status & log
  System status
  System logging
  User logged on list
System administration
System statistics Apply changes
Login as a different user
Logout

System logging

System logging :    Enable
System log storage location :    Memory
System log to SYSLOG server :    Disable
System log buffer size (KB, 300 max.) :    32
Automatic backup on mounting :    Enable
Send system log by Email :    Disable
Number of log messages to send a mail (1-100) :    5
System log recipient's mail address :    admin@yourcompany.com
System log :

```
07-09-2005 09:30:21 > sshd: Failed password for invalid user gabriel from 193.6.9.5 port 44784 ssh2
07-09-2005 09:30:23 > sshd: Failed password for gergely from 193.6.9.5 port 44884 ssh2
07-09-2005 09:30:24 > sshd: Failed password for invalid user gergely from 193.6.9.5 port 44884 ssh2
07-09-2005 09:30:26 > sshd: Failed password for giorgio from 193.6.9.5 port 44993 ssh2
07-09-2005 09:30:26 > sshd: Failed password for invalid user giorgio from 193.6.9.5 port 44993 ssh2
07-09-2005 09:30:29 > sshd: Failed password for hajni from 193.6.9.5 port 45116 ssh2
```

*Fig. 17*

User : cmadmin

Console Server Configuration and Management

Network
Serial port
Clustering
Power controller
System status & log
System administration
System statistics
  Network interfaces
Serial ports
  IP
  ICMP
  TCP
  UDP Apply changes Login as a different user Logout

Serial ports statistics

| Port | Baud Rate | Tx | Rx | RTS | CTS | DTR | DSR | CD |
|---|---|---|---|---|---|---|---|---|
| 1 | 38400 | 0 | 0 | ● | ● | ● | ● | ● |
| 2 | 38400 | 0 | 0 | ● | ● | ● | ● | ● |
| 3 | 9600 | 9 | 1151 | ○ | ○ | ● | ○ | ● |
| 4 | 38400 | 0 | 0 | ● | ● | ● | ● | ● |
| 5 | 9600 | 396 | 11043 | ● | ● | ● | ● | ● |
| 6 | 38400 | 0 | 0 | ● | ● | ● | ● | ● |
| 7 | 9600 | 186 | 30657 | ○ | ● | ○ | ● | ● |
| 8 | 38400 | 0 | 0 | ● | ● | ● | ● | ● |
| 9 | 9600 | 68 | 3091 | ● | ● | ○ | ● | ● |
| 10 | 38400 | 0 | 0 | ● | ● | ● | ● | ● |
| 11 | 38400 | 0 | 0 | ● | ● | ● | ● | ● |
| 12 | 38400 | 0 | 0 | ● | ● | ● | ● | ● |
| 13 | 38400 | 0 | 0 | ● | ● | ● | ● | ● |
| 14 | 38400 | 0 | 0 | ● | ● | ● | ● | ● |
| 15 | 38400 | 0 | 0 | ● | ● | ● | ● | ● |
| 16 | 38400 | 0 | 0 | ● | ● | ● | ● | ● |

*Fig. 18*

SYSTEM AND METHOD FOR COMMUNICATING WITH CONSOLE PORTS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright© 1996-2005 Digi International. All rights reserved.

TECHNICAL FIELD

This patent document pertains generally to console servers, and more particularly, but not by way of limitation, to control of devices by a console server.

BACKGROUND

When communication with a piece of data equipment across the network is lost, out-of-band access to the data equipment can often be used to regain control. Out-of-band access means access that is not linked to the network stack; it provides access outside the network link for control and configuration of data equipment.

Many pieces of data equipment are equipped with serial ports termed console ports. Each console port is typically handled by the core of the operating system within the piece of data equipment, and not by any subordinate instance. The console port is often, therefore, the most reliable path to communicate with the kernel. For many pieces of data equipment, the console port is the only mechanism that can be used for initial configuration and emergency management.

Console servers connect to console ports in order to provide "out-of-band" access to data equipment. A console server typically includes a network connection and one or more serial ports. Devices such as servers, routers, switches, private branch exchanges (PBX), firewalls, and other such network devices can be controlled by the console server through the console server's serial ports. Unfortunately, there is no standard way of communications with the various devices. Typically, Virtual Network Computing (VNC) software is used to control UNIX and LINUX systems through their console port. Remote Desktop software is used to control Microsoft Windows-based systems through their console port. Other devices can only be communicated with at a fairly primitive level.

What is needed is a system and method for recognizing and controlling a variety of devices through a console server.

SUMMARY

In a console server having a user interface and one or more ports, a system and method of accessing devices connected to the ports is described. A device connected to one of the ports is recognized, wherein recognizing includes recording in a port log information received through a port on a console server from a device that is communicatively coupled to the port and executing instructions that read the information in the port log and determine an operating system that is running on the device from the information in the port log. An application for communicating with the recognized device is selected and the console server communicates with the device using the selected application.

BRIEF DESCRIPTION OF THE DRAWINGS

FIGS. 5-18 are various screen shots in one embodiment of console server;

DETAILED DESCRIPTION

Figure 1:
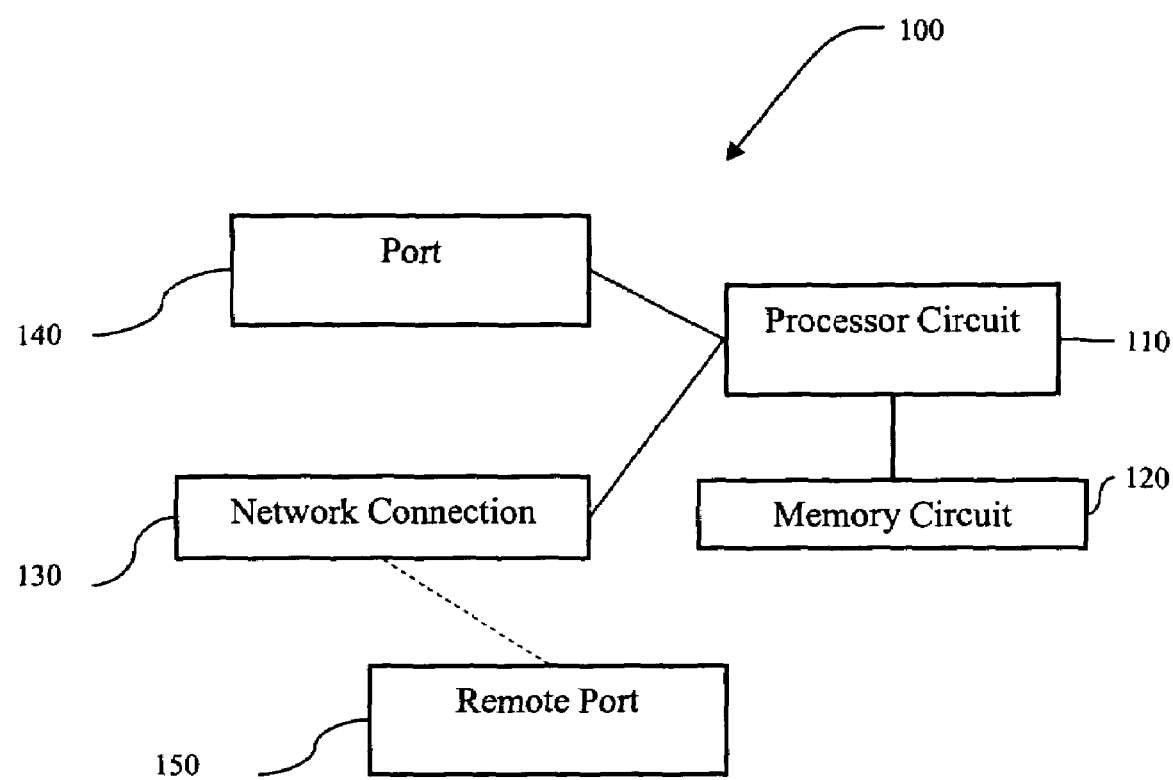
FIG. 1 is a schematic illustration of a console server.

A schematic illustration of an example console server 100 is shown in FIG. 1. Console server 100 includes a processor circuit 110, a memory circuit 120, a network connection 130 and ports 140 and 150. In one example embodiment, ports 140 and 150 are serial ports. Examples of serial ports include RS232, RS 422 and RS 485 connections.

In the example shown, port 150 is a remote serial (or virtual serial) port accessed through network connection 130. In such an embodiment, console server 100 communicates over a network through a virtual serial port to a piece of data equipment as if the piece of data equipment was connected to a port 140. The configuration and use of remote serial ports is described in "System and Method for Accessing Devices with a Console Server," U.S. patent application Ser. No. 11/1793, 38, the description of which is incorporated herein by reference.

In one example embodiment, each port 140 and 150 includes an on/off switch that allows automatic device detection or recognition to be turned on and off. Automatic device detection or recognition is described in "Recognition of Devices Connected to a Console Server," U.S. patent application Ser. No. 11/112,146, the description of which is incorporated herein by reference. In one such embodiment, ports 140 and 150 also include an on/off switch that allows automatic updating of the port name to be turned on and off.

In one example embodiment, network connection 130 is an Ethernet port. In another example embodiment, network connection 130 is a connection to another type of network, such as a wireless network connection or a modem. In one example embodiment, console server 100 includes a PCMCIA card slot into which a network device is inserted.

In one example embodiment, network connection 130 couples console server 100 to a TCP/IP network, to the internet, or to a dial-up modem connection. In one such embodiment, communications with console server 100 are encrypted to provide secure access to console server 100 and to each of its connected devices.

In the embodiment shown in FIG. 1, network connection 130 is connected to the processor circuit 110. Network administrators can access ports 140 and 150 through processor circuit 110 by connecting through network connection 130. In an example embodiment, a server connected to port 140 is accessible by a computer that is coupled to network connection 130.

In one example embodiment, processor circuit 110 includes an integrated circuit on a chip. In one example embodiment, memory circuit 120 includes a RAM chip. In another example embodiment, memory circuit 120 includes a flash memory chip or a flash memory card.

Figure 2:
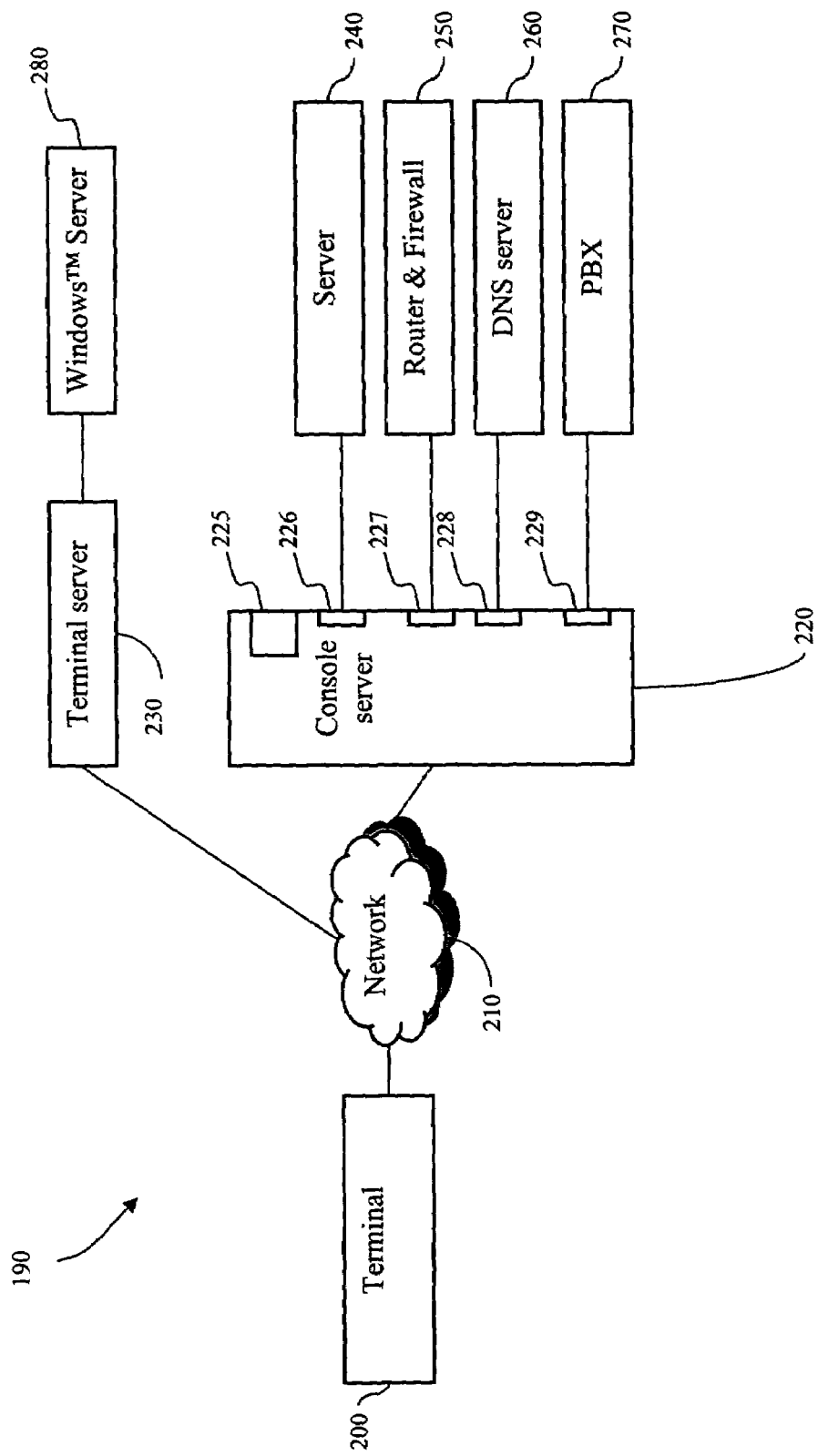
FIGS. 2 and 3 are a schematic illustration of a system of data equipment controlled by a console server.

FIG. 2 is a schematic illustration of a system 190 in which a console server 220 is connected to data devices via ports 225-229. A terminal 200 controls the data devices through a console management program executing within console server 220. In one example embodiment, terminal 200 is a thin client. A personal computer such as a WINDOWS or Linux machine, or a workstation could be used as well. In one example embodiment, network 210 includes a TCP/IP network. A wireless network, internet connection, or a dial-up connection could be used as well.

In the example shown in FIG. 2, ports 225, 226, 227, 228, and 229 connect devices such as servers or network gear to console server 220. In the example shown in FIG. 2, port 226 is connected to a Linux server 240. Port 227 is connected to a router and firewall 250. Port 228 is connected to a DNS server 260. Port 229 is connected to a private branch exchange (PBX).

Console server 220 provides centralized management and configuration of data equipment such as routers, switches and servers from anywhere on network 210, over the internet, or through dial-up modem connections, even if the device to be configured is unavailable through network 210. Such an approach eliminates the need for system administrators to travel to remote data centers, since instead of connecting directly to the router or server with a laptop or terminal, system administrators now connect to console server 220 via telnet or Secure Shell (SSH).

In the embodiment shown in FIG. 2, console server 220 supports remote ports. Remote ports are ports that can be accessed by console server 220 through another device. PortServer® Terminal Servers from Digi International, for example, provide serial ports which can be accessed across a network using telnet or SSH protocol. In the example shown in FIG. 2, console server 220 is connected via a remote port 225 to a WINDOWS™ server 280 via terminal server 230. In one such embodiment, terminal server 230 is a PortServer® Terminal Server from Digi International.

Remote ports allow system administrators to use console server 220 as a central access system for any kind of text based out-of-band management. Even devices located in other locations within a facility or in remote sites can now be managed by a single console server 220.

In one embodiment, users manage remote servers simply by installing near the remote device a cost-effective device server or terminal server (such as terminal server 230), which seamlessly integrates with console server 220. The device/terminal server acts as a proxy to connect the new remote console port to console server 220.

Such an approach adds console server features to the remote devices, including central authentication and logging, increases scalability and provides for cost-effective expansion and centralized management and failure detection.

Figure 3:
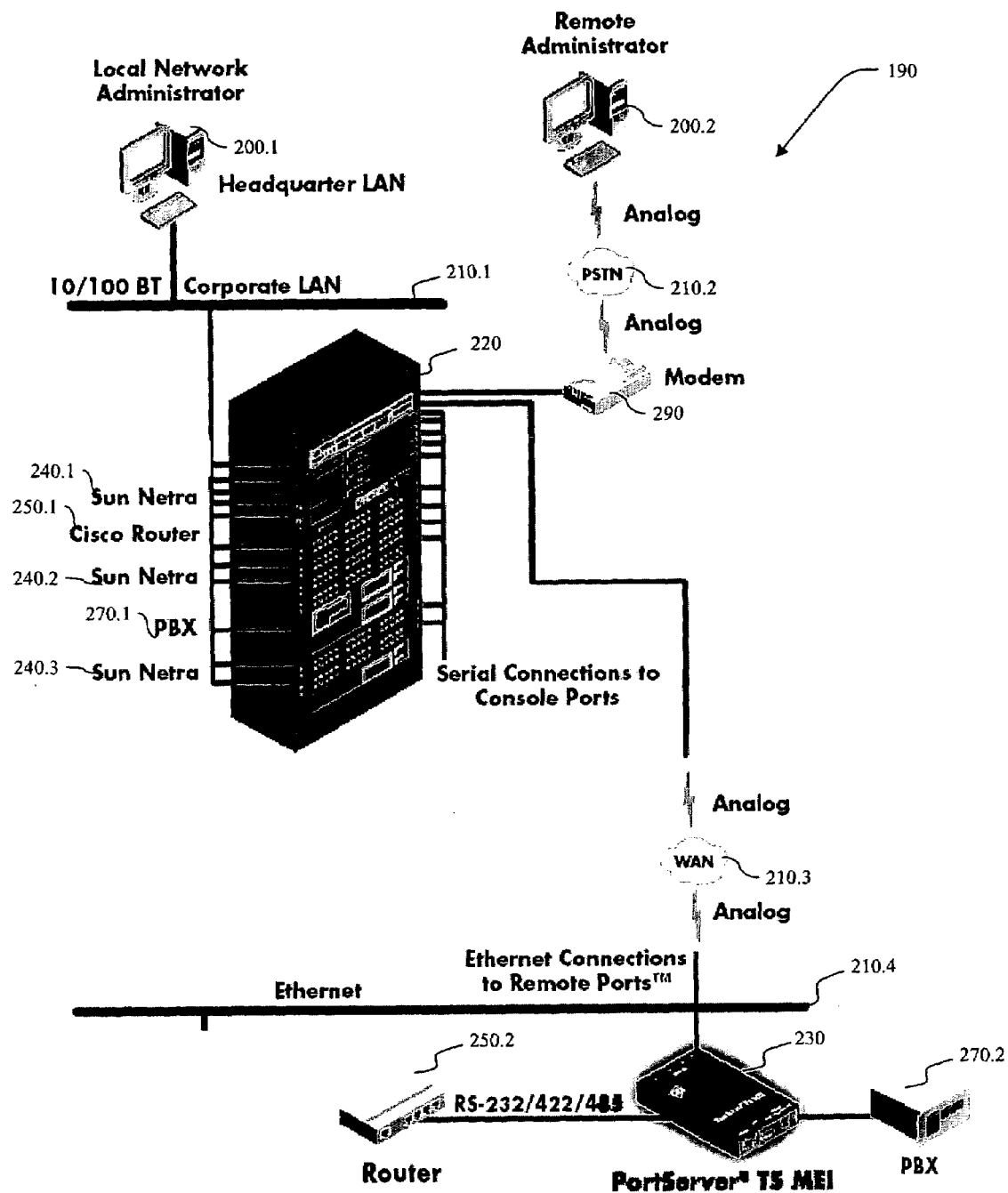

Another example embodiment of system 190 is shown in FIG. 3. In system 290 of FIG. 3, console server 220 is connected over its serial ports to modem 290, to Sun Netra servers 240.1, 240.2 and 240.3, to Cisco router 250.1 and to PBX 270.1 . In addition console server 220 uses its remote ports to connect across networks 210.3 and 210.4 to terminal server 230, and through terminal server 230 to router 250.2 and PBX 270.2.

A local network administrator configures Sun Netra servers 240.1, 240.2 and 240.3, Cisco router 250.1, PBX 270.1 and 270.2 and router 250.2 by accessing console server 220 over network 210.1 using workstation 200.1. In addition, a remote administrator can configure Sun Netra servers 240.1, 240.2 and 240.3, Cisco router 250.1, PBX 270.1 and 270.2 and router 250.2 by accessing console server 220 over network 210.2 through modem 290 using computer 200.2.

Configuration of a remote port is discussed next.

Figure 4:
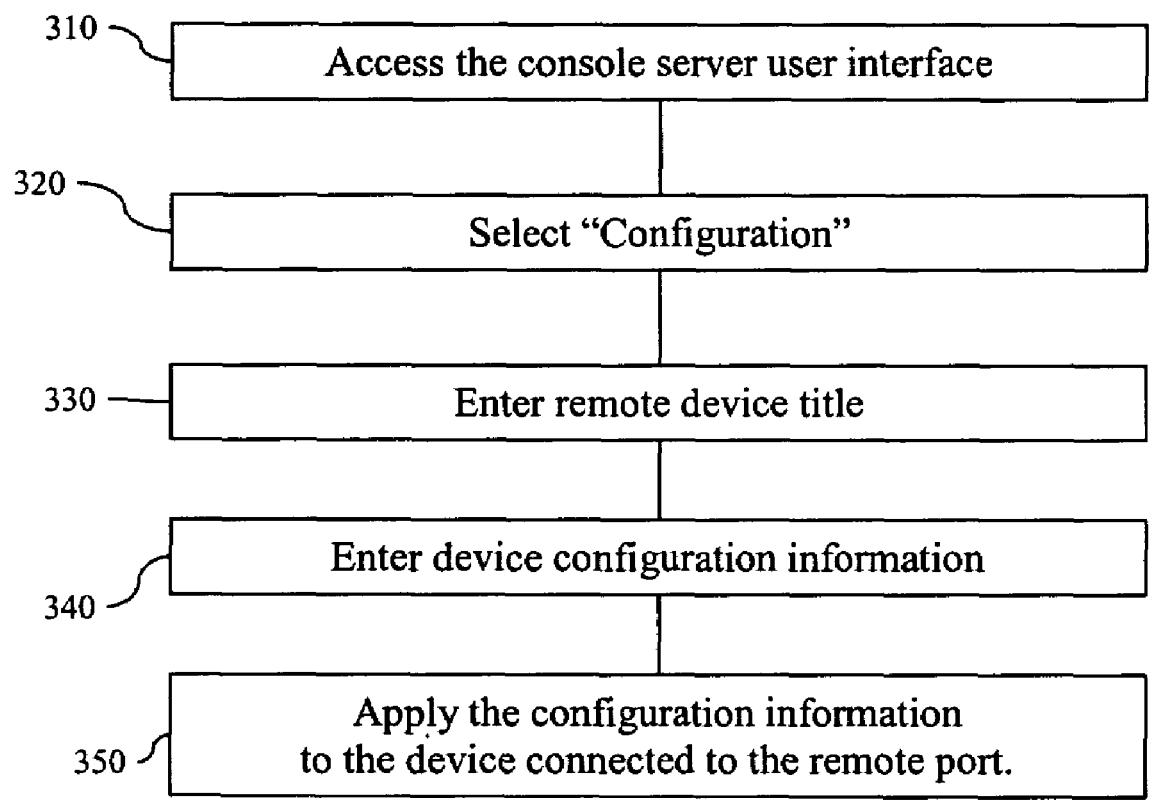
FIG. 4 is a flowchart that illustrates a method of configuring a remote port.

In one embodiment, a remote port is set up as shown in FIG. 4. In the example shown in FIG. 4, at 310, the user accesses the console server user interface. Control then moves to 320, where the user selects "Configuration". In one embodiment, console server 220 displays a configuration screen such as is shown in FIG. 5. Control then moves to 330, where the user enters a remote device title under the section marked "Remote Port" and selects "Add". Control then moves to 440, where the user enters device configuration information (see FIG. 6). Control then moves to 450, where the configuration information is applied to the device connected to the remote port.

In the embodiment shown in FIG. 6, the information that can be modified includes whether or not the remote port is enabled, the port title, the port settings, the host mode configuration, the remote port parameters, how and whether to perform port logging, port IP filtering, authentication method, user access control, alert configuration and power control configuration (if applicable).

Host mode configuration is shown in FIG. 7. In the example shown in FIG. 7, host mode configuration includes host mode selection, selection of the type of console server, communications protocol and other parameters as shown.

Some example ports include a variety of host mode settings. An Activate MICROSOFT WINDOWS SERVER 2003 Web-UI setting or an Activate Rackable System Management Board Web-UI setting allows a user interface to be launched. An IP Address Per Port setting controls the number and type of IP addresses assignable to the port. A Protocol setting sets protocols such as telnet, secure shell (ssh), or raw. A Port Escape Sequence (^z) setting allows definition of a character sequence to reach an escape menu. A Port Break Sequence setting allows definition of the sequence to send a serial break signal. An Inactivity Timeout setting provides for disconnection after an amount of time, which is optionally specifiable.

Remote port parameter selection is shown in FIG. 8. In the example shown in FIG. 8, the user can enter an IP Address for the remote port, and select a port and communications protocol. The IP address may be for the intermediate device (such as terminal server 230) or for the device being controlled itself.

In one such embodiment, the protocols that can be selected include Telnet, Secure Shell (SSH) and RawTCP.

In one embodiment, console server 220 includes the ability to set serial settings for each remote port. Serial settings include, for example, data transfer rate, data bits, parity, stop bits, flow control, and DTR (data terminal ready) behavior.

Port logging selection is shown in FIG. 9. In the example shown in FIG. 9, the user can enable port logging and select whether to log server output, user input, or both (with or without arrows). The user can select the port log storage location (e.g., memory or CF card) and whether to store the port log to the SYSLOG server. Other parameters can be selected as shown. Other settings include port-log size, port-log filename, timestamp (e.g. whether every message is time stamped), and Strip ^M (to strip ^M commands) settings.

Port IP filtering is shown in FIG. 10. In the example shown in FIG. 10, the user can select an allowed base host IP address and a subnet mask as shown.

Figure 11:
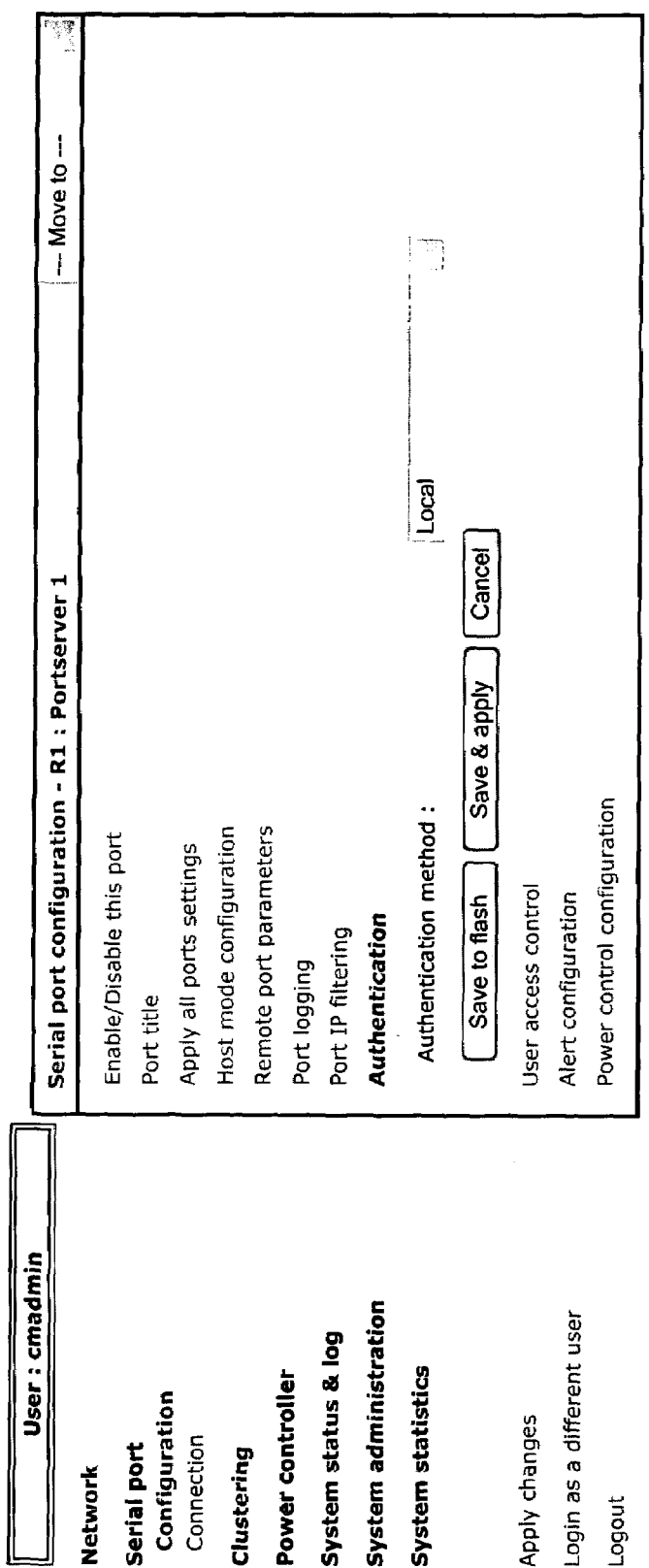

Authentication is shown in FIG. 11. In the example shown in FIG. 11, the user can select an authentication method to be used to restrict access to the device attached to the remote port. In one such embodiment, authentication may be based on local authentication, or through authentication based on a RADIUS server, a TACACS+ server, an LDAP server, a Kerberos server, custom PAM, or any combination thereof.

User access control is shown in FIG. 12. In the example shown in FIG. 12, access can be limited based on user identifier. In the example shown, user access can be determined by pointing to an access list as well.

In an example, user access is configurable according to operating system, so that particular users have access only to devices having specified operating systems. In another example, user access is configurable by device. Other examples include Read only, Read-write, and Power control settings.

Alert configuration for devices connected to the remote port can be set as shown in FIG. 13. In the example shown in FIG. 13, the user can set up an email alert configuration and an SMNP trap configuration.

In the embodiment shown, the Email Notification setting determines, for example, the title and recipient of an alert. In an example, when a device from a particular source (e.g. CISCO) is connected to a port, an alert message is sent to appropriate recipients associated with the source (e.g. CISCO operators.)

Figure 14:
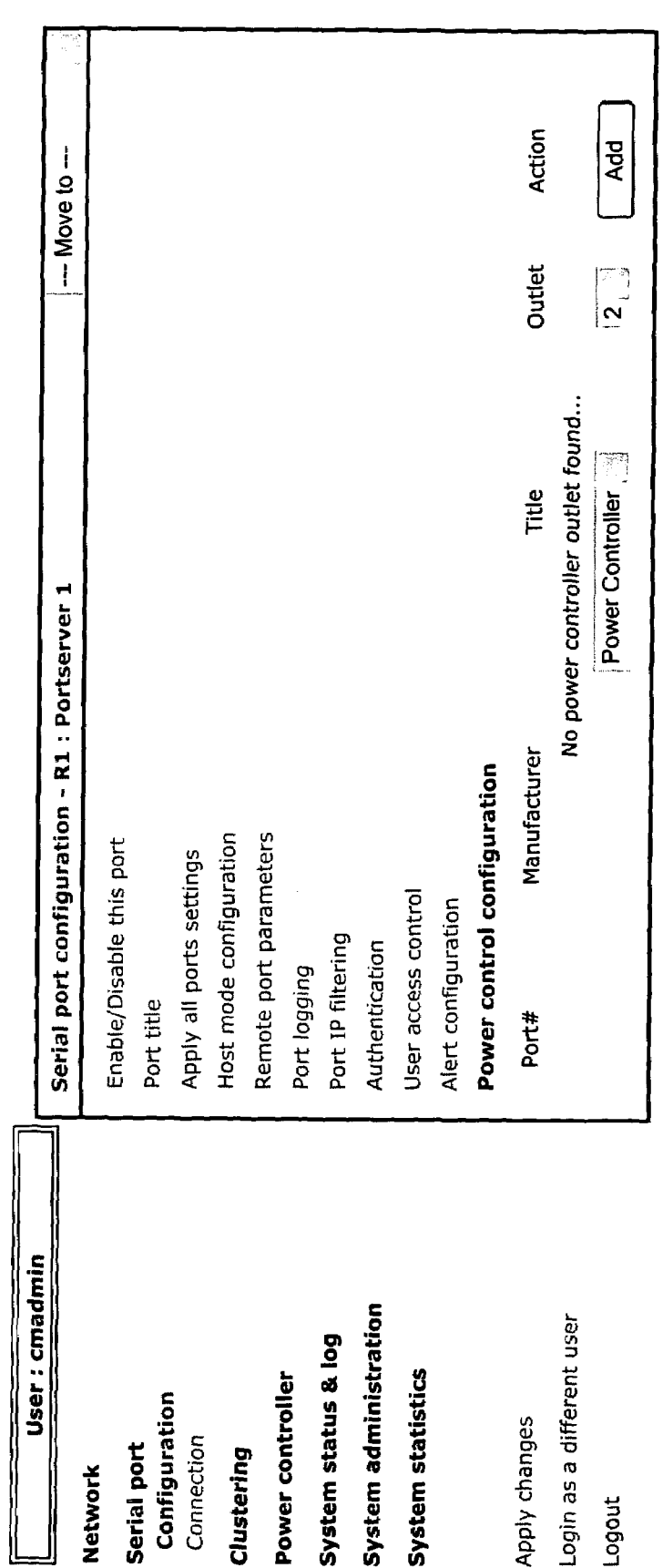

An SNMP (simple network management protocol) trap setting determines the recipient of SNMP traps Sometimes a power controller will be attached to the device connected to the remote port. In those situations, console server 220 can control the power to the device using the configuration setup shown in FIG. 14. Similarly, console server can control a power controller attached to devices connected to its local ports as shown in FIG. 16.

In one embodiment, once all ports and remote ports have been configured, they are displayed as shown in FIG. 15.

System status and logging can be displayed for console server 220 as shown in FIG. 17. System statistics can be displayed as well. FIG. 18 displays one example of monitoring serial ports for console server 220. The network interfaces and various types of network traffic can be monitored as shown there as well.

As noted above, a console server can be used to control a variety of devices. In the past, one had to configure the console server to communicate with the types of device that were connected to its serial ports. In addition, the user had to invoke different applications based on their knowledge of the device being controlled and the proper application to be used for that device.

Figure 19:
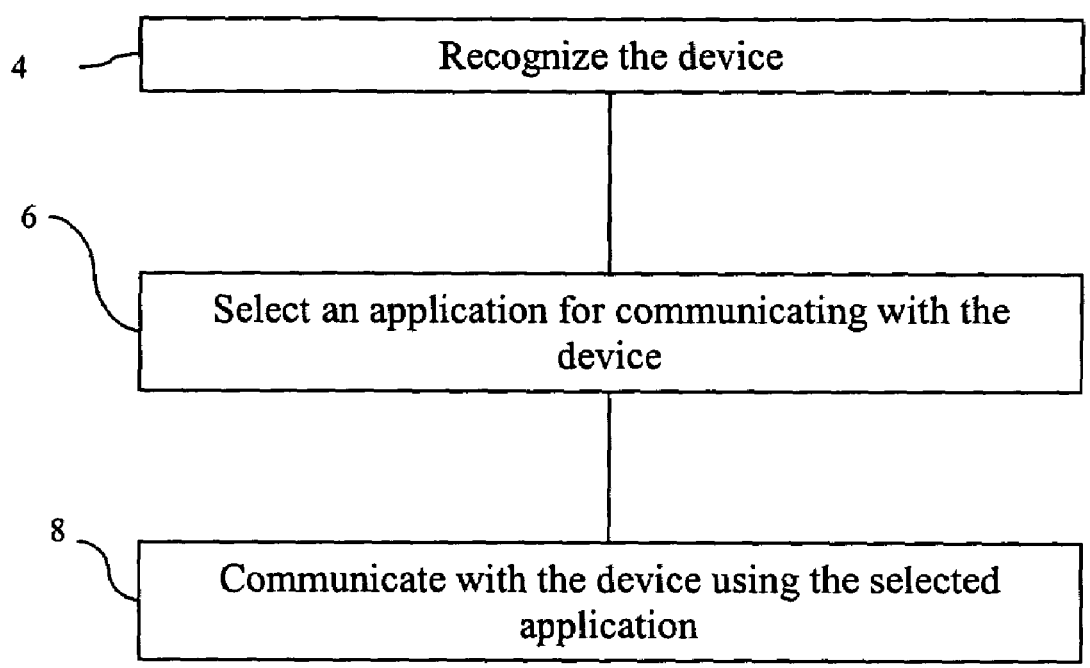
FIG. 19 is a flowchart that illustrates a method of communicating with a device attached to a console server.

A method of controlling a device is shown in FIG. 19. The method can be used to recognize and configure devices connected to any of the console server's serial or remote ports.

In the example method shown in FIG. 19, at 4, a device connected to a console server is recognized as detailed below. Recognition may include, for instance, a computer's name, IP address and operating system.

Control moves to 6, where the system selects an application for communicating with the device recognized at 4. For instance, in the case of a UNIX or LINUX box, the application might be Virtual Network Computing (VNC) software.

In the case of a Microsoft Windows-based system, the application might be the Remote Desktop software available from Microsoft Corporation.

Other graphically-based user interfaces may be used as well. For example, in one embodiment, a graphical interface for a particular device is presented via a HTTP/HTTPS protocol server. In another embodiment, a graphical interface for a particular device is based on graphical libraries and Windows-Icon-Menu-Pointer handling routines, as is common with many modern general purpose computer operating systems (such as the UNIX/LINUX and Windows systems discussed above).

Control then moves to 8, and the user communicates with the device using the selected application.

Automatic device detection or recognition of devices accessed through a console server's serial port or remote port will be discussed next.

A device connected to a console server is recognized using information obtained through a port to which the device is connected. In an example, the console server "passively" examines a connected device by examining information in a port log. In the example illustrated in FIG. 20, information such as the name of the device or the operating system running on the device is determined from information in a port log. In another example, the console server "actively" examines a connected device by sending a probing character or string and examining a response. A flowchart illustrating a method that includes sending a probing character or sequence associated with an operating system is provided in FIG. 21.

Figure 22:
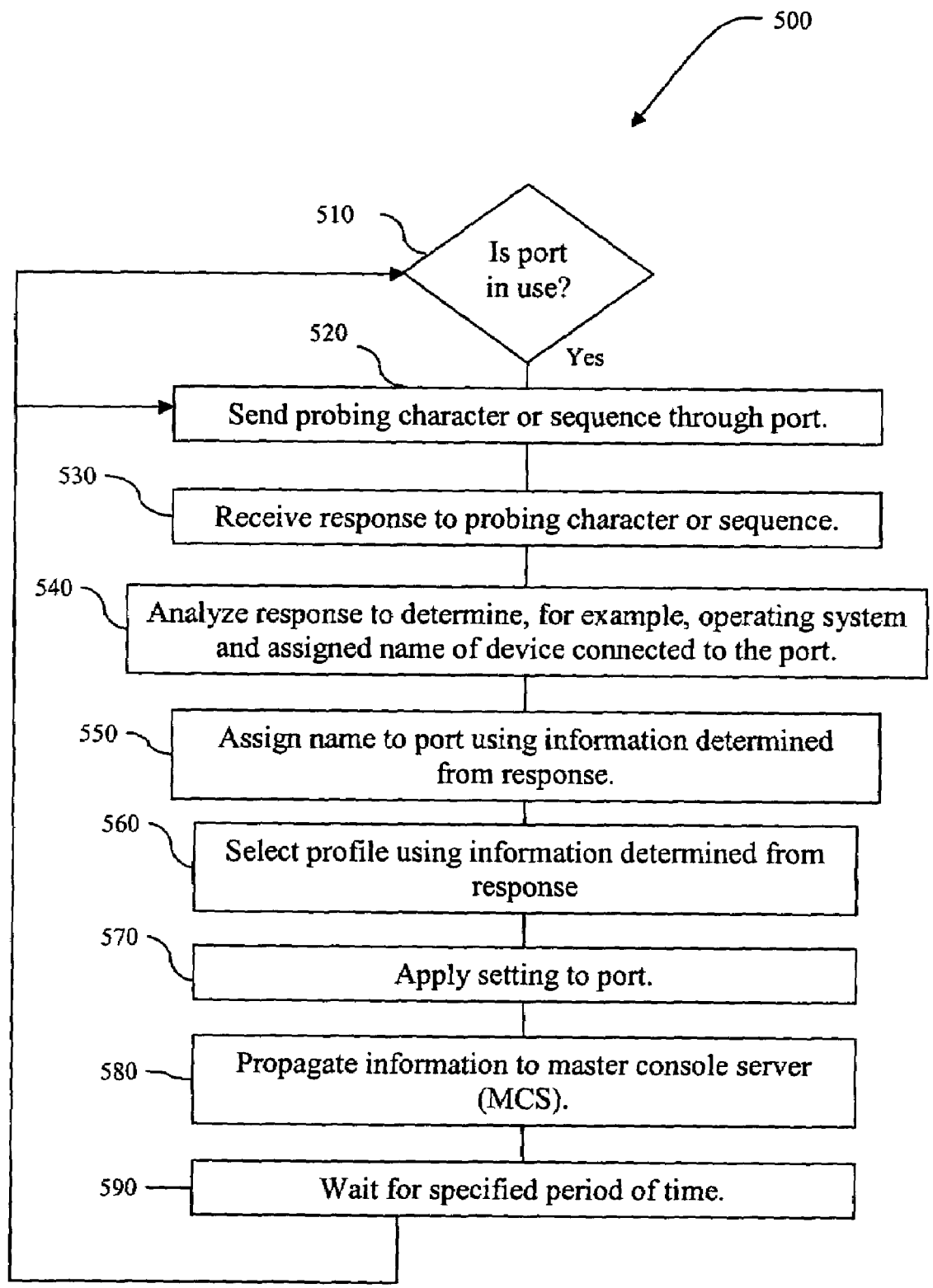
FIG. 22 is a flowchart that illustrates a method that includes sending a probing character and analyzing a response.

FIG. 22 is a flowchart that illustrates a method in which a profile is identified using a response to a probing character or sequence. In an example, a console server port is dynamically reconfigurable using information obtained from a port log, or from a response to a probing character or string. Port settings, optionally specified by a profile, are applied to the port based upon information that is determined about the port. In the example illustrated in FIG. 23, where a device previously connected to a first port is recognized at a second port, at least one port setting from the first port is applied to a second port. In some examples, automated recognition of devices and/or configuration of ports speed up the initial configuration of a console server and/or reduces administrative overhead associated with managing the console server.

Figure 20:
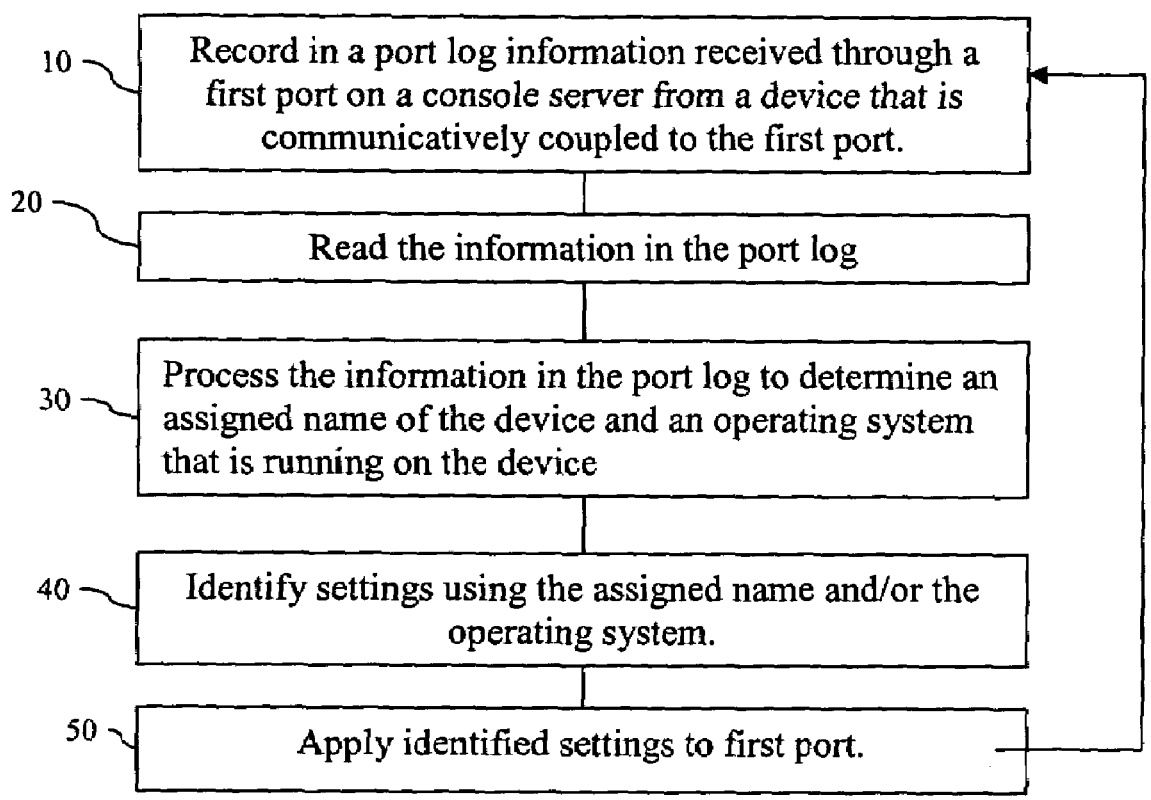
FIG. 20 is a flowchart that illustrates a method that includes determining information about a device from a port log.

Referring now to the example method illustrated by the flowchart in FIG. 20, at 10 information received through a port on a console server 220 from a device that is communicatively coupled to the port is recorded in a port log. In an example, the device is physically connected to the port, for example with a serial cable. In another example, the device is connected to the port through a network connection, such as a LAN network, the internet, and/or a wireless network. In an example, a boot sequence is recorded in the port log. At 20, information, such as the boot sequence, is read from the port log. At 30, information from the port log is processed to determine information about the device, such as the assigned name (hostname) of the device, and an operating system (e.g. WINDOWS, CISCO EOS, SUN Solaris, LINUX) that is running on the device. In another example, the type of device (e.g. SUN) or the location of the device is determined from the port log. In an example, a script is run that determines the name of the device and the operating system. In an example, the script determines not only the operating system, but also the version number of the operating system (e.g. WINDOWS Server 2003). In an example, the script is user-configurable. In an example the script uses standard bash commands and writes output to one or more files.

Returning to FIG. 20, at 40, information about the device, such as the assigned name and/or the operating system, is used to identify port settings. In an example, a settings profile is identified. In an example, the profile is associated with the assigned name of the device and/or the operating system of the device. At 50, identified settings are applied to the port. In an example, the settings are specified by a profile. In an example, a port name is assigned to the port such as main-router. In an example, the assigned port name provides information about the device that is connected to the port, such as the assigned name of the device and the operating system that is running on the device. In an example, a user access setting is applied to the port. An example user access setting applied to a port allows only specified users access to a device. In an example, user access is controlled by device, device type, or operating system (e.g. only administrators are allowed access to devices having a certain operating system.) In another example, an alert setting controls a recipient list for alerts relating to the port. In an example, operators or administrators of a specific operating system are sent an alert relating to a device running the specific operating system.

In an example, the port log is periodically examined to identify changes in the connected device or the operating system running on the connected device. In an example, the timing of the periodic examination of the port log is user-configurable. In an example, the port log is examined every five minutes. In an example, the console server waits an amount of time and examines the port log again to confirm the change and avoid erroneous setting change. If a change is confirmed, port settings and/or the port name are updated. In another example, the port log is examined when a device is connected or disconnected to the port. In an example, the ports of a console server are dynamically reconfigurable as the connection of devices to ports is changed. For example, if cables are mixed up after disconnecting and reconnecting devices, an example console server automatically updates port names and/or port settings.

Figure 21:
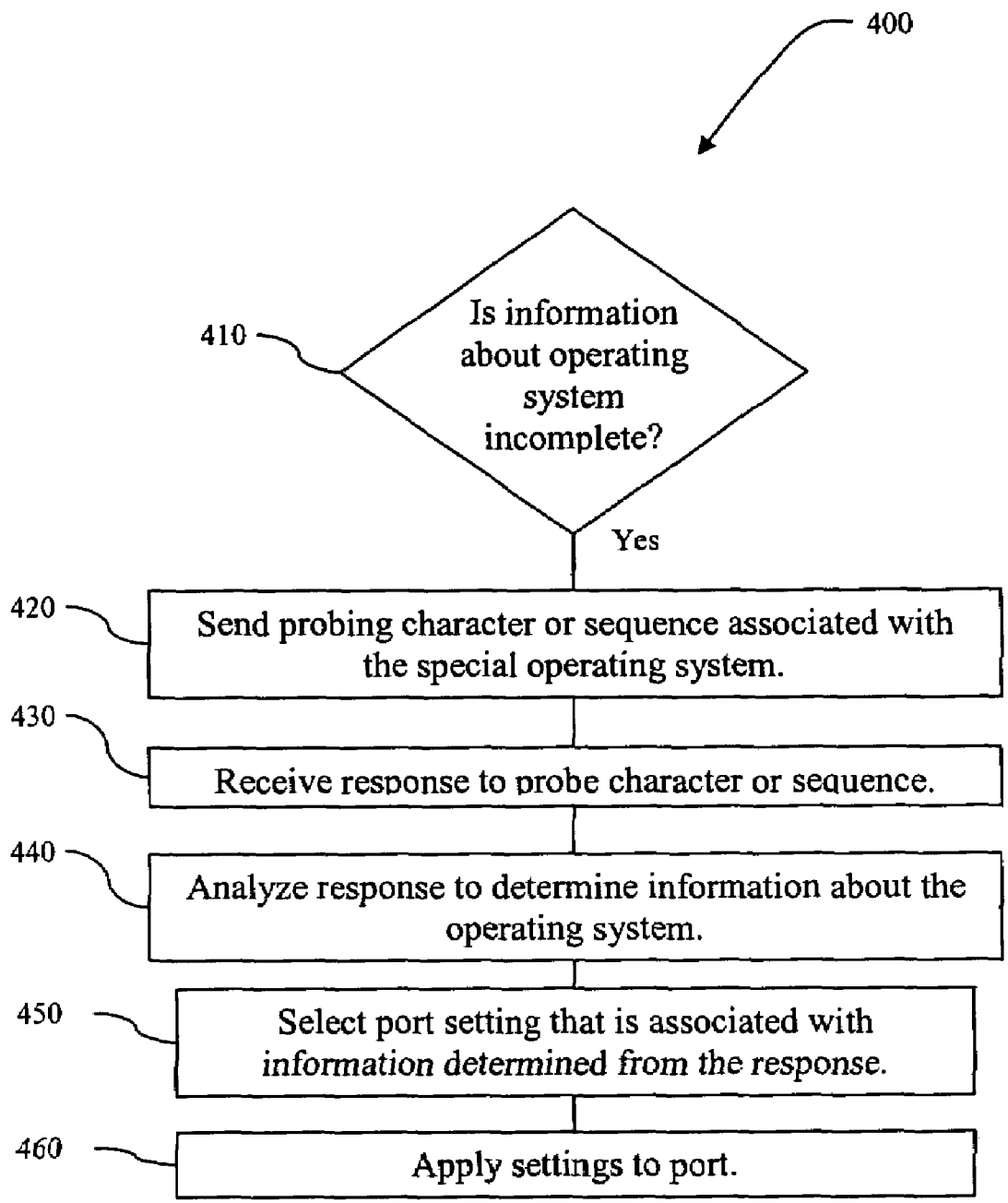
FIG. 21 is a flowchart that illustrates a method that includes sending a probing character or sequence associated with an operating system and determining information about the operating system from the response.

FIG. 21 is a schematic illustration of another example method 400. At 410, a processor examines information received from device through a port to determine whether the information about the operating system is incomplete. For example, some operating systems, such as WINDOWS 2003, provide a limited response to a probing character or string, and a particular probing string causes the device to send more complete information that includes, for example, server name, revision level, and/or patch level. In another example, information in the port log about an operating system is incomplete, and a probing character or sequence is sent to obtain further information. Returning to FIG. 21, if the information about the operating system running on the device is incomplete, or alternatively if a particular operating system is running on the device and known to provide incomplete information (e.g. WINDOWS 2003), at 420, a probing character or probing sequence associated with the operating system is sent through the port to the device. At 430, a response to the probe character or sequence is received through the port. At 440, the response is analyzed to determine information about the operating system running on the device, such as a server name, operating system revision level and/or operating system patch level. At 450, one or more port settings associated with the information determined from the response is selected. At 460, the one or more settings are applied to the port. In an example, the port is also named to convey information about the operating system running on the device connected to the port.

An example "active" device recognition method 500 is illustrated in the flow chart provided in FIG. 22. At 510, a console server optionally determines whether a port is in use. At 520, a probing character or probing sequence is sent through the port. In an example, the probing character is an Enter (CR=0x0d). At 530, a response to the probing character or probing sequence is received through the port. At 540, the response is analyzed to determine information about the device, such as the operating system and/or the assigned name (hostname) of the device connected to the port. At 550, a name is assigned to the port using information determined form the response. In an example, the name includes information about the device, such as the hostname and/or the operating system. At 560, a profile is selected using the information about the device determine from the response. In an example, a profile associated with the device name is selected. In another example, a profile associated with the operating system, a device type (e.g. SUN), or a device location is selected. In some examples, the profile is selected based upon a combination of the device name, device type, operating system, device location, or other device characteristics. At 570, settings are applied. In an example, the settings are specified by the profile. At 580, information is propagated to a master console server. At 590, the console server waits a specified period of time (e.g. five minutes), and then returns to 510 or 520, at which point a probing character is again sent through the port.

Figure 23:
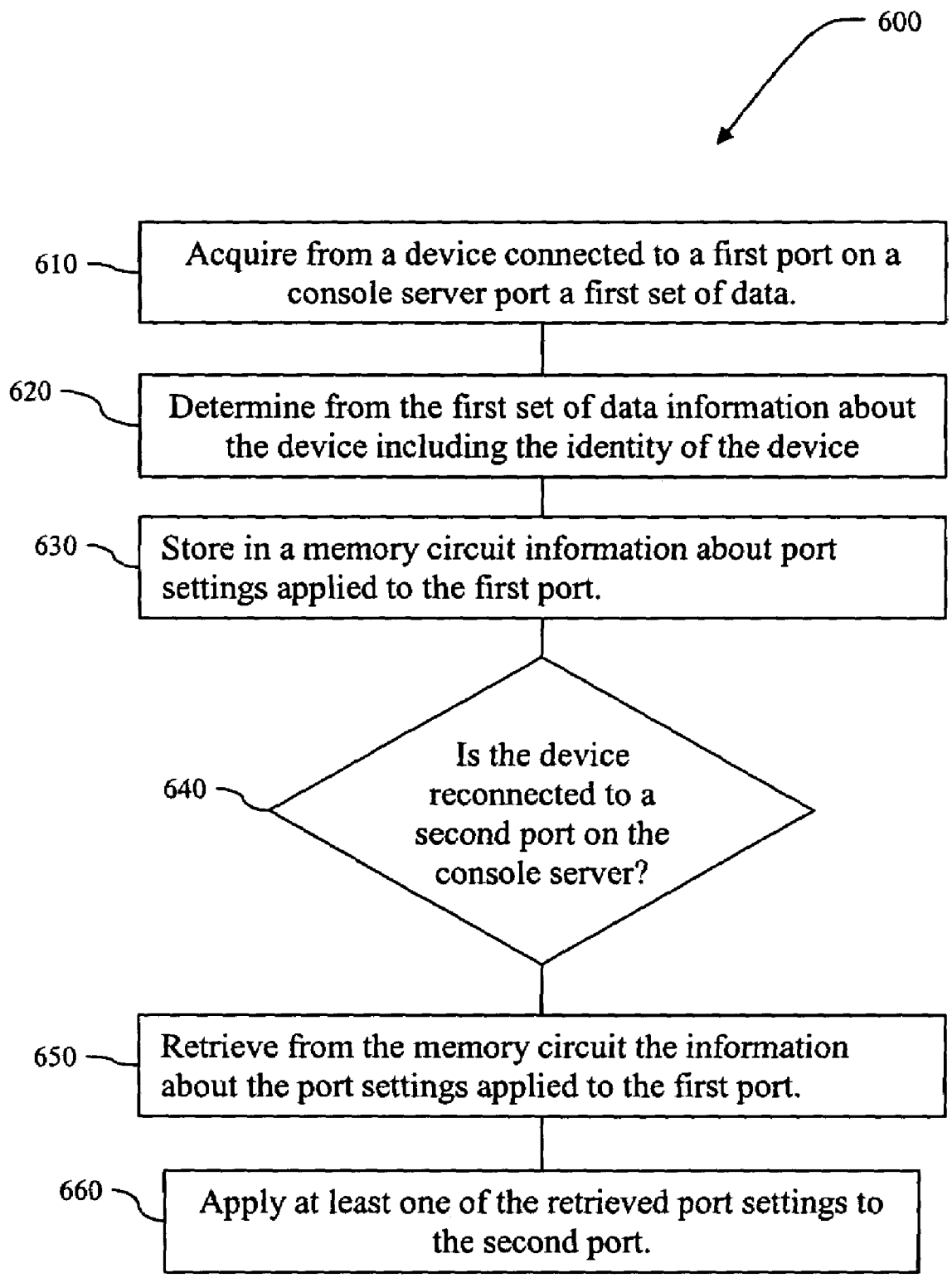
FIG. 23 is a flowchart that illustrates a method that includes recognizing connection of a device to a second port and copying first port settings to the second port.

FIG. 23 provides a flow chart that illustrates another example method 600. At 610, a first set of data is acquired from a device connected to a first port on a console server. In an example, the first set of data is a boot sequence recorded in a port log. In another example, the first set of data is a response to a probing character or sequence. At 620, information about the device including, for example, the identity of the device, is determined from the first set of data acquired from the device. In an example, the identity of the device includes the device type (e.g. SUN), the assigned name (hostname) of the device, and/or the operating system that is running on the device. At 630, information about port settings applied to the first port is stored in a memory circuit. In an example, a new profile is generated for the device. At operation 640, the console server recognizes the device when it is reconnected to a different second port on the console server. In an example, the console passively recognizes the device by examining a port log for the second port. In another example, the console server actively recognizes the device by sending a probing character or sequence (probe string) and analyzing the response from the device connected to the port. At 650, information about the port settings applied to the first port is retrieved from the memory circuit. In an example, a new template created by the console server is retrieved from the memory circuit. At 660, at least one of port setting is applied to the second port. In an example, the at least one port setting applied to the second port is determined from the information about the port setting retrieved from the memory circuit. In an example, the at least one port setting applied to the second port is specified by a profile. In an example, the at least one port setting applied to the second port is the same as a port setting applied to the first port.

Figure 24:
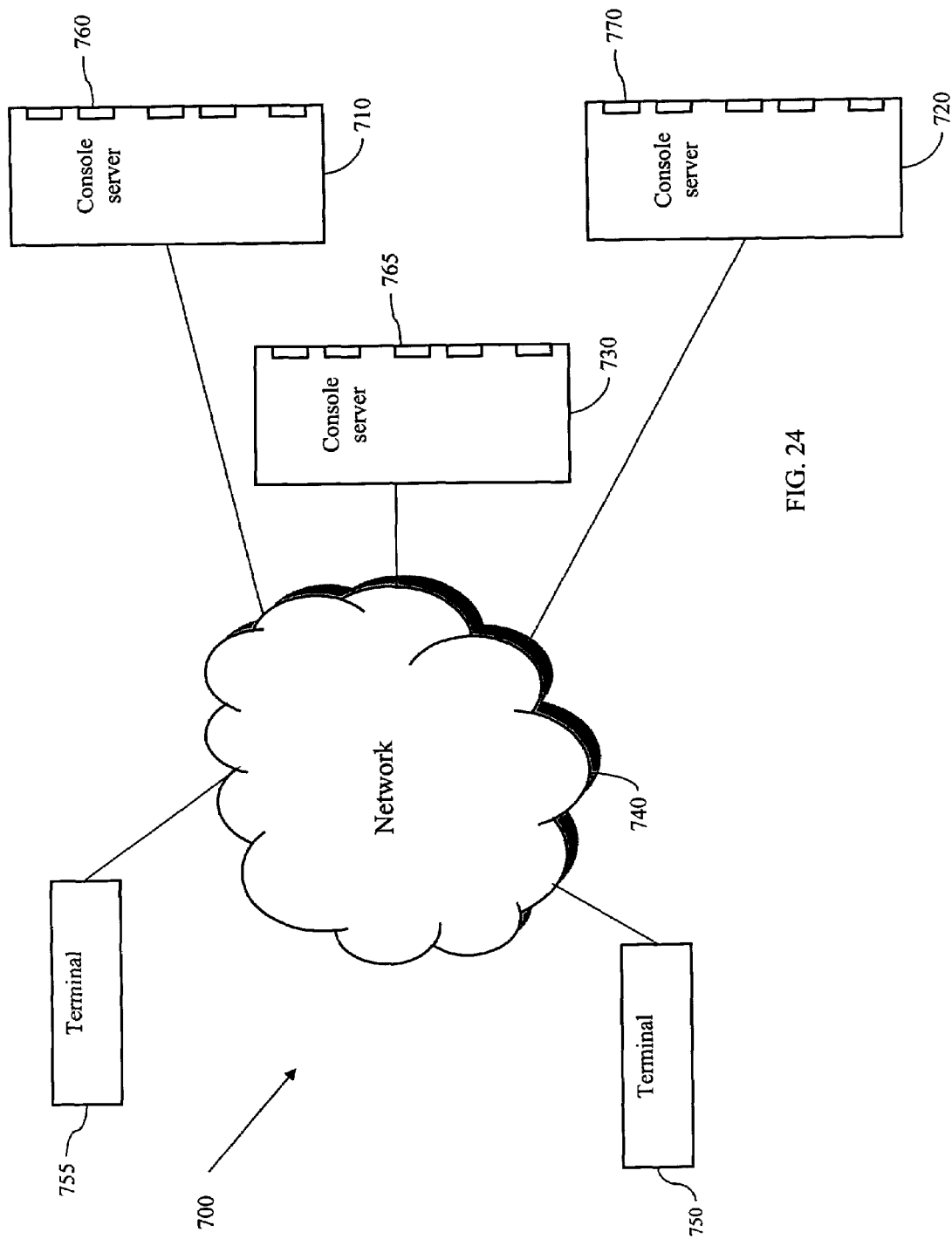
FIG. 24 is a schematic illustration of a plurality of console servers connected through a network.

FIG. 24 shows a system 700 that includes plurality of console servers 710, 720, 730 connected to a network 740. In an example, information about port settings is transferred between or among console servers. In an example, a device is connected to a port 760 on a console 710, and a profile is generated for the device. The profile is transmitted to a second console serve 720. If the device is recognized at a port 770 on the second console server 720, port settings are applied to the port 770 on the second console server 720 using a profile or other information about the port settings obtained from the first console server.

In another example, a console server 730 is a master console server, and other console servers 710, 720 are slave console servers. A profile or other information about port settings for a device is transferred from a first server 710 to the master console 730, and is then transmitted to the other slave console server 720.

When a device is disconnected from slave console server 710 and reconnected to master console server 730 or slave console server 720, port settings are applied to the port to which the device is connected using the information about the port settings applied on the first console server. In an example, the port settings on the first console server 710 are set manually by a human administrator. Transferring the settings to other console servers allows a port to which the device is connected to be configured by the console server without further input from a human administrator. In another example, port settings associated with an operating system, a device model and/or device type are transferred between or among console servers. When another device of the same device model or type or running the same operating system is recognized, port settings are applied using information about the port settings applied on the first console server.

The automatic device recognition and control method described above simplifies the provisioning of the data center. It can also be used, for instance, in Point of Sale applications to control a device server connected to a network having both wireline Ethernet (such as 802.3) and wireless Ethernet (such as 802.11b) components attached to a printer, a terminal, a weigh scale, and a cash drawer.

In another example, the method can be used to control a device server connected to a finger-print reader and a badge printer, as, e.g., at a building security desk.

In another example, the method can be used to control a device server connected through via a wireless or a cellular network to a pipeline flow controller or an electrical substation controller.

In one embodiment, communications with the console or device server over network 210 are encrypted to provide secure access and prevent interception of the data.

In one example embodiment, there is one operating system and one graphical interface per managed system. In another example embodiment, there is one operating system with multiple distinct graphical interfaces, each providing different permissions or access controls. System 190 must be able to differentiate between the various graphical interfaces.

In another example embodiment, using server consolidation techniques, one physical system (such as server 280) hosts more than one operating system instance, and each instance may have one or more graphical interfaces associated with it. Each of these instances may have independent requirements for control and access. System 190 differentiates between the operating system instances in selecting the appropriate application to use in communicating with that instance.

We have described a method for extending the capabilities of an appliance like a device or console server to provide among other capabilities the ability for users to connect to different types of graphical interfaces on different types of equipment, to automatically determine the most likely type of access for each device and to provide a method for automatically establishing the connections on request.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. In a console server having a user interface and one or more ports, a method of out-of-band access to devices connected to the ports for control and configuration of the devices, the method comprising:
   providing a plurality of applications for execution on the console server, wherein the applications are for communicating with devices connected to the console server and wherein the plurality of applications include a first and a second application, wherein the first application is used by the console server to communicate with a first device when the first device is executing a first operating system and the second application is used by the console server to communicate with the first device when the first device is executing a second operating system;
   recognizing a device communicatively connected to one of the ports, wherein recognizing includes:
      recording in a port log information received from the device through a port on the console server that is connected to a console port of the device, wherein the console port is handled by the operating system of the device; and
      executing instructions that read the information in the port log and determine an operating system that is running on the device as a result of processing the information in the port log;
   automatically selecting an application from the plurality of applications as a function of the operating system of the recognized device, wherein automatically selecting an application includes selecting the first application when the console server determines that the operating system of the recognized device is the first operating system and selecting the second application when the console server determines that the operating system of the recognized device is the second operating system; and
   communicating with the operating system of the recognized device using the selected application.

2. The method of claim 1, wherein the port log information includes an address associated with the device.

3. The method of claim 1, wherein the port log information includes a name associated with the device.

4. The method of claim 3, wherein executing instructions includes executing instructions that:
   send a probing transmission through the port;
   receive a response to the probing transmission; and
   determine information about the operating system of the device from the response to the probing transmission.

5. The method of claim 4, wherein executing instructions that send a probing transmission through the port includes executing instructions that encrypt the probing transmission.

6. The method of claim 3, wherein the console server includes one or more remote ports, wherein executing instructions includes executing instructions that:
   send a probing transmission through the remote port;
   receive a response to the probing transmission; and
   determine information about the operating system of the device from the response to the probing transmission.

7. The method of claim 6, wherein executing instructions that send a probing transmission through the port includes executing instructions that encrypt the probing transmission.

8. The method of claim 1, wherein executing instructions includes executing instructions that analyze a boot sequence in the port log.

9. A console server out-of-band access to devices having console ports for control and configuration of the devices, the console server comprising:
   a processor circuit;

a network connection communicatively coupled to the processor circuit;

a plurality of ports, where each port is communicatively coupled to the processor circuit and wherein each port is capable of reading and writing information from a console port; and memory connected to the processor circuit, wherein the memory includes instructions which, when executed by the processor circuit, cause the processor circuit to access a device connected to one of the console ports, access a port log recording information communicated from the device through one of the console ports, determine an operating system running on the device as a result of processing the information in the port log and automatically select, as a function of the operating system of the device, an application for communicating with the operating system of the device.

10. The console server of claim 9, wherein the memory further includes instructions which, when executed by the processor circuit, cause the processor circuit to send a probing transmission through the port, receive a response to the probing transmission and determine information about the operating system of the device from the response to the probing transmission.

11. The console server of claim 9, wherein the console server further comprises means for encrypting data prior to transmitting the data through one or more of the ports.

12. A console server for out-of-band access to devices having console ports for control and configuration of the devices, the console server comprising:

a processor circuit;

memory connected to the processor circuit;

a network connection communicatively coupled to the processor circuit;

a plurality of ports, where each port is communicatively coupled to the processor circuit and wherein each port is capable of reading and writing information from a console port;

means for recognizing a device, wherein the means for recognizing includes means for determining an operating system that is running on the device as a result of processing the information in a port log, wherein the information includes information communicated from the device through one of the console ports;

means for automatically selecting, as a function of the operating system of the recognized device, an application for communicating with the recognized device; and means for communicating with the operating system of the recognized device using the selected application.

13. The console server of claim 11, wherein the means for recognizing a device further includes:

means for sending a probing transmission through a port connected to the device;

means for receiving a response to the probing transmission; and means for determining information about the operating system of the device from the response to the probing transmission.

14. The console server of claim 9, wherein the console server further comprises means for encrypting data prior to transmitting the data through one or more of the ports.

15. The method of claim 1, wherein automatically selecting an application from the plurality of applications as a function of the operating system of the recognized device includes differentiating between operating system instances when selecting the application for communicating with the recognized device.

16. The console server of claim 9, wherein the instructions allow the processor circuit to differentiate between operating system instances when selecting the application for communicating with the recognized device.

* * * * *

UNITED STATES PATENT AND TRADEMARK OFFICE
CERTIFICATE OF CORRECTION

PATENT NO. : 7,689,675 B2  
APPLICATION NO. : 11/200876  
DATED : March 30, 2010  
INVENTOR(S) : Ben Tucker Page 1 of 1

It is certified that error appears in the above-identified patent and that said Letters Patent is hereby corrected as shown below:

In column 4, line 2, delete "270.1 ." and insert -- 270.1. --, therefor.

In column 5, line 34, after "traps" insert -- . --.

In column 10, line 64, in Claim 9, after "server" insert -- for --.

Signed and Sealed this

Twenty-fifth Day of May, 2010

David J. Kappos
*Director of the United States Patent and Trademark Office*